United States Patent
Zhao

(10) Patent No.: US 11,832,293 B2
(45) Date of Patent: Nov. 28, 2023

(54) DATA TRANSMISSION METHOD AND DEVICE

(71) Applicant: DATANG MOBILE COMMUNICATIONS EQUIPMENT CO., LTD., Beijing (CN)

(72) Inventor: Yali Zhao, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 352 days.

(21) Appl. No.: 17/413,941

(22) PCT Filed: Sep. 11, 2019

(86) PCT No.: PCT/CN2019/105478
§ 371 (c)(1),
(2) Date: Jun. 14, 2021

(87) PCT Pub. No.: WO2020/119195
PCT Pub. Date: Jun. 18, 2020

(65) Prior Publication Data
US 2022/0086861 A1    Mar. 17, 2022

(30) Foreign Application Priority Data
Dec. 13, 2018   (CN) .......................... 201811524438.4

(51) Int. Cl.
*H04W 72/566* (2023.01)
*H04W 24/02* (2009.01)
(Continued)

(52) U.S. Cl.
CPC ......... *H04W 72/569* (2023.01); *H04W 24/02* (2013.01); *H04W 28/0252* (2013.01); *H04W 80/02* (2013.01)

(58) Field of Classification Search
None
See application file for complete search history.

(56) References Cited

U.S. PATENT DOCUMENTS 7,751,323 B2 *  7/2010  Kim ....................... H04L 47/30
                                              370/468
2009/0092202 A1 *  4/2009  Kim ................... H04W 28/0257
                                              375/295
(Continued)

FOREIGN PATENT DOCUMENTS

CN    102769603 A    11/2012
CN    107241164 A    10/2017
(Continued)

OTHER PUBLICATIONS

Vivo, "Activation/Deactivation of Packet Duplication", 3GPP TSG RAN WG2 NR AdHoc, Qingdao, China, Jun. 27-Jun. 29, 2017, total 3 pages, R2-1707068.
(Continued)

*Primary Examiner* — Edan Orgad
*Assistant Examiner* — Emmanuel K Maglo
(74) *Attorney, Agent, or Firm* — KILPATRICK TOWNSEND & STOCKTON, LLP

(57) ABSTRACT

The present application discloses a data transmission method and device, the method includes determining whether one or more timers related to survival time corresponding to a specific bearer are running; performing special processing on the specific bearer when the one or at least one of the more timers is running; the special processing includes when organizing a MAC PDU, processing the specific bearer in one or a combination of following manners, and/or activating a PDCP duplication for the specific bearer: manner 1: temporarily increasing a priority of the specific bearer; manner 2: temporarily canceling a priority restriction on a logical channel of the specific bearer, allow-
(Continued)

S101 — determine whether one or more timers related to survival time corresponding to a data packet of a specific bearer are running S102 — perform special processing configured to improve a success rate of data transmission on the data packet of the specific bearer when the one or at least one of the more timers is running ing use resources that reduce time latency and improve reliability; manner 3: temporarily starting repetition transmission, and performing automatic repetition transmission of a data packet of the specific bearer on an adjacent scheduled resource device.

16 Claims, 2 Drawing Sheets

(51) Int. Cl.
*H04W 28/02* (2009.01)
*H04W 80/02* (2009.01)

(56) References Cited

U.S. PATENT DOCUMENTS

| | | | |
|---|---|---|---|
| 2015/0264615 A1* | 9/2015 | Zhao | H04W 24/10 370/329 |
| 2018/0145798 A1* | 5/2018 | Suzuki | H04L 43/0864 |
| 2018/0234997 A1* | 8/2018 | Hosseini | H04L 1/08 |
| 2018/0317114 A1* | 11/2018 | Kim | H04L 1/1635 |
| 2019/0215731 A1* | 7/2019 | Qiao | H04W 28/0268 |
| 2019/0280834 A1* | 9/2019 | Joseph | H04L 47/29 |
| 2020/0145904 A1* | 5/2020 | Kim | H04W 28/0278 |
| 2020/0274654 A1* | 8/2020 | Loehr | H04L 1/1887 |

FOREIGN PATENT DOCUMENTS

| | | |
|---|---|---|
| WO | 2015184854 A1 | 12/2015 |
| WO | 2018131975 A1 | 7/2018 |
| WO | 2018203697 A1 | 11/2018 |

OTHER PUBLICATIONS

Ericsson, "Inactivity timer on E1", 3GPP TSG RAN WG3 #101, Gothenburg, Sweden, Aug. 20-24, 2018, total 63 pages, R3-185024.
Nokia et al.,"TSN performance requirements evaluation", 3GPP TSG-RAN WG2 Meeting #103bis, Chengdu, China, Oct. 8-12, 2018, total 9 pages, R2-1814992.
Nokia et al.,"On PDCP Duplication Enhancements with Combination of DC and CA", 3GPP TSG-RAN WG2 Meeting #104, Spokane, USA, Nov. 12-16, 2018, total 7 pages, R2-1817583.

* cited by examiner

DATA TRANSMISSION METHOD AND DEVICE

CROSS REFERENCE TO RELATED APPLICATIONS

The present application is a US National Stage of International Application No. PCT/CN2019/105478, filed Sep. 11, 2019, which claims priority to Chinese Patent Application No. 201811524438.4, filed to the China National Intellectual Property Administration on Dec. 13, 2018 and entitled "Data Transmission Method and Device".

FIELD

The present application relates to the field of communication, in particular to a data transmission method and device.

BACKGROUND

A 5G New Radio (NR) system mainly supports three types of services:
enhanced Mobile Broadband (eMBB);
massive Machine Type Communications (mMTC); and
Ultra-Reliable and Low Latency Communications (URLLC).

In essence, the Industrial Internet of Things (IIOT) service generally requires high reliability and low latency, and it can be considered to belong to the URLLC service among the three major types of services of 5G NR.

For the IIOT service, a service layer has a survival time requirement. The survival time refers to the longest time that the service layer can tolerate not receiving a desired message. With regard to a receiving end, if a message is received incorrectly, if the next message cannot be correctly received within specific time (the minimum value is the sum of end-to-end latency, jitter, and survival time), this service will be considered unusable. The survival time requirement of the service layer needs to be guaranteed by an access network, and when reflected to the access network, the survival time guarantee of the service layer is unavailability of continuous packet loss.

It can be seen that the problem that needs to be solved at present is how to reduce the transmission latency of data packet transmission, improve the reliability of data packet transmission, and after the transmission of a certain data packet of a bearer has failed, ensure, to the greatest possible extent, that subsequent data packets are successfully transmitted, meeting the requirements of IIOT and other special services with regard to packet loss.

SUMMARY

Embodiments of the present application provide a data transmission method and device, which are used to reduce transmission latency of data packet transmission of the specific bearer and improve reliability of data packet transmission, and may, after transmission of a certain data packet of a bearer has failed, ensure, to the greatest possible extent, that subsequent data packets are successfully transmitted, meeting requirements of IIOT and other special services with regard to packet loss.

According to a first aspect of the embodiments of the present application, a data transmission method is provided, including:

determining whether one or more timers related to survival time corresponding to a data packet of a specific bearer are running; and
performing special processing on the data packet of the specific bearer when the one or at least one of the more timers is running.

Through the data transmission method provided according to the embodiments of the present application, whether the one or more timers related to survival time corresponding to the data packet of the specific bearer are running is determined; and when the one or at least one of the more timers is running, special processing is performed on the data packet of the specific bearer, which may reduce transmission latency of data packet transmission and improve reliability of data packet transmission, and may, after transmission of a data packet of a bearer has failed, ensure, to the greatest possible extent, that subsequent data packets are successfully transmitted, meeting requirements of IIOT and other special services with regard to packet loss.

According to a second aspect of the embodiments of the present application, a data transmission device is provided, including: a memory, configured to store a program instruction; and a processor, configured to call the program instruction stored in the memory and execute the following according to an obtained program:

determining whether one or more timers related to survival time corresponding to a data packet of a specific bearer are running; and
performing special processing on the data packet of the specific bearer when the one or at least one of the more timers is running.

According to a third aspect of the embodiments of the present application, another data transmission device is provided, including:
a first device, configured to determine whether one or more timers related to survival time corresponding to a data packet of a specific bearer is running; and
a second device, configured to perform special processing on the data packet of the specific bearer when the one or at least one of the more timers is running.

According to a fourth aspect of the embodiments of the present application, a computer storage medium is provided, and the computer storage medium stores a computer-executable instruction, and the computer-executable instruction is configured to make a computer execute the data transmission method according to the first aspect.

BRIEF DESCRIPTION OF THE DRAWINGS

In order to more clearly describe the embodiments of the present application, drawings that need to be used in description of the embodiments will be briefly introduced as follows. Apparently, the drawings in the following description are only some embodiments of the present application.

DETAILED DESCRIPTION OF THE EMBODIMENTS

Figure 1:
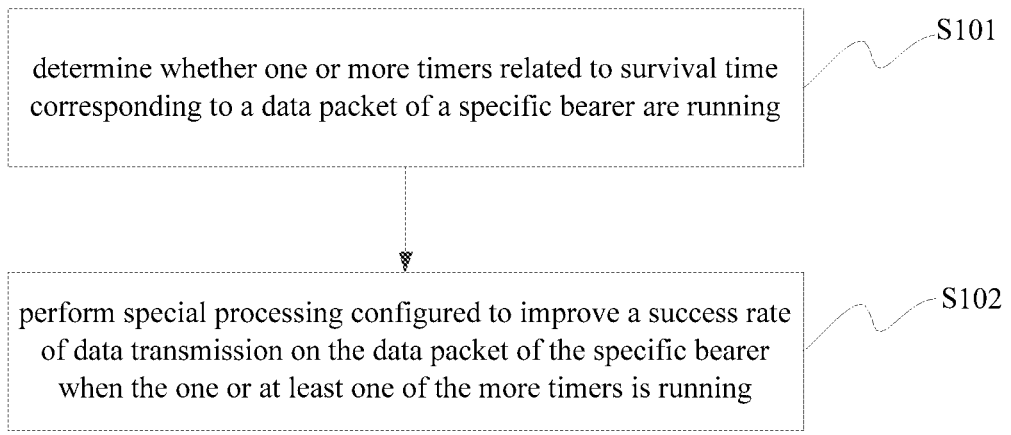
FIG. 1 is a schematic flowchart of a data transmission method provided according to an embodiment of the present application.

The embodiments of the present application will be clearly and completely described below in conjunction with drawings in the embodiments of the present application. Apparently, the described embodiments are only a part of the embodiments of the present application, not all of the embodiments.

The embodiments of the present application provide a data transmission method and device, which are used to reduce transmission latency of data packet transmission of the specific bearer and improve reliability of data packet transmission, and may, after transmission of a data packet of a bearer has failed, ensure, to the greatest possible extent, that subsequent data packets are successfully transmitted, meeting requirements of IIOT and other special services with regard to packet loss.

The method and the device are based on the same application concept. Due to the fact that the method and the device have similar principles for solving problems, implementations of the device and the method can be referred to each other, and unnecessary details will not be given to repetitions.

The embodiments of the present application may be applicable to various systems, especially 5G systems. For example, applicable systems may be a global system of mobile communication (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WiMAX) system, a 5G system, a 5G NR system, etc. These various systems each include terminal devices and network devices.

The terminal devices involved in the embodiments of the present application may be devices that provide voice and/or data connectivity to a user, handheld devices with wireless connection functions, or other processing devices connected to wireless modems. In different systems, names of the terminal devices may be different. For example, in the 5G system, the terminal devices may be called user equipment (UE).

A wireless terminal device may communicate with one or more core networks via a radio access network (RAN). The wireless terminal device may be a mobile terminal device, such as a mobile phone (or "cellular" phone) and a computer with the mobile terminal device, for example, may be a portable, pocket-sized, handheld, built-in computer or in-vehicle mobile device. The wireless terminal devices exchange language and/or data with the radio access network. For example, include a personal communication service (PCS) phone, a cordless phone, a session initiated protocol (SIP) phone, a wireless local loop (WLL) station, a personal digital assistant (PDA) and other devices are applicable.

The wireless terminal device may also be referred to as a system, subscriber device, subscriber station, mobile station, remote station, access point, remote terminal, access terminal, user terminal, user agent or user device, which is not limited in the embodiments of the present application.

The network devices involved in the embodiments of the present application may be base stations, and the base stations may include cells. Depending on specific application scenarios, the base stations may also be called access points, or may refer to devices that communicate with the wireless terminal devices through one or more sectors on an air interface in the access network, or other names. The network devices may be used to convert received air frames and internet protocol (IP) packets to each other, as routers between the wireless terminal devices and the rest of the access network. The rest of the access network may include an IP communication network. The network devices may also coordinate attribute management of the air interface. For example, the network devices involved in the embodiments of the present application may be base transceiver stations (BTS) in a GSM system or a CDMA system, NodeB in a WCDMA system, evolutional node B in an LTE system, 5G base stations in 5G network architecture (next generation system), home evolved node B, relay node, femto, pico and the like, which are not limited in the embodiments of the present application.

Hereinafter, each embodiment of the present application will be described in detail with reference to drawings of the specification. It should be noted that a displayed order of the embodiments of the present application only represents a sequence of the embodiments, and does not represent the pros and cons of the solutions provided according to the embodiments.

A physical layer of an NR system supports multiple Numerology/TTI. The concepts of Numerology and TTI are as follows.

Numerology is a professional term of 3GPP RAN1, which can be translated into baseband parameters. A main difference between different Numerology is that sub-carrier spacings supported by different Numerology are different. For example, sub-carrier spacings supported by a 5G NR system at least include 15 KHz and 60 KHz. Numerology corresponding to these two different sub-carrier spacings are two independent Numerologies. Generally speaking, Numerology used by high-speed terminals is different from Numerology used by low-speed terminals; and Numerology used by high frequency and low frequency is also different. In addition to speed and frequency related to use of different Numerology, the industry also understands that Numerology that may be used by different services may also be different, for example, Numerology used by URLLC and eMBB may be different.

TTI stands for a transmission time interval. In a traditional LTE system, a TTI length is 1 ms. Starting from LTE R14, in order to support time latency reduction, different TTI lengths have been introduced, such as one OFDM symbol length. Different TTI lengths are used in 5G systems and may be applied to each Numerology, that is, different Numerology in 5G NR may use different TTI lengths, or the same TTI length, and the TTI lengths used for different terminals on a Numerology may be dynamically changed at any one time. Selection of the TTI lengths is mainly related to service latency. For example, due to a relatively high latency requirement that URLLC service supports, a short TTI length may be selected, such as a TTI length of one OFDM symbol.

For the NR system, Numerology and/or TTI corresponding to a bearer/logical channel are/is configured through a network. For example, when the bearer/logical channel is established, the network may configure the Numerology and/or TTI corresponding to the bearer/logical channel through radio resource control (RRC) signaling. Selection of the TTI lengths is mainly related to service latency. For example, due to a relatively high latency requirement that URLLC service supports, a short TTI length may be selected, such as a TTI length of one OFDM symbol.

For the NR system, factors that need to be considered in Uu interface LCP are called logical channel restrictions (LCH restrictions), which specifically include:

allowed SCS-list, used to reflect the latency requirement;

allowed max PUSCH-duration, used to reflect the latency requirement;

configured grant type1 allowed, used for URLLC; and allowed serving cells, introduced by packet data coverage protocol (PDCP) duplication, but usage is not limited to PDCP duplication.

A specific resource allocation process based on LCH restrictions is as follows.

Step 1: For Each Uplink Grant (UL Grant), a Logical Channel that May Use the UL Grant is Selected.

For each UL grant, a logical channel that may use the UL grant is selected according to the following requirements (the following requirements need to be met at the same time):

a logical channel with the configured allowed SCS-list that contains an SCS index of the UL grant is selected;

a logical channel whose configured max PUSCH-duration is greater than or equal to PUSCH transmission duration corresponding to the UL grant is selected.

If the UL grant is a configured grant of Type 1, then a logical channel with configuredGrantType1Allowed set to TRUE needs to be selected; and the UL grant is located in the configured allowed serving cells of the logical channel.

Step 2: Resource Allocation is Performed for Each UL Grant.

For each UL grant, resource allocation is performed on the logical channel that may use the UL grant.

The logical channels with the number of tokens Bj>0 in all token buckets are allocated in descending order of priority with resources required to meet prioritized bit rate (PBR) requirements.

According to resource allocation of the previous step, Bj of each logical channel is updated; and if there are remaining resources, the resources are allocated to remaining data of each logical channel according to the descending order of each logical priority again, until the resources are exhausted or no data needs to be allocated with resources.

For the IIOT service, TR22.804 requires that error probability of two consecutive data packets is negligible, that is, when a first data packet of the IIOT service fails, it is tried to ensure that a second data packet can be correctly transmitted within limited time. Based on this, the present disclosure provides a data transmission method and device, which can reduce data transmission latency and improve reliability.

In the embodiments of the present application, a terminal specific protocol layer determines whether one or more timers related to survival time set for a service data packet of a specific bearer are running. If the one or at least one of the more timers related to survival time is running, special processing is performed on the bearer. One timer is maintained for each data packet of the specific bearer, and different data packets correspond to different timers. The special processing specifically includes that special processing is performed on the specific bearer and/or PDCP duplication corresponding to the bearer is activated when organizing a media access control (MAC) packet data unit (PDU).

Specifically, the specific protocol layer may refer to a PDCP layer or a radio link control (RLC) layer or a media access control (MAC) layer.

The specific bearer specifically refers to a bearer with a survival time requirement. When the specific bearer is specifically identified, it can be identified by a bearer-related special identifier. The special identifier may be carried by a quality of service (QoS) parameter during establishment of a session or a dedicated radio bear (DRB), and may also be notified by cross-layer interaction.

Lengths of the one or more timers may be fixed values or determined based on services, may be configured by a network, or agreed by a protocol. Their values are related to survival time, for example, it may be half of the survival time corresponding to the services.

Special processing for carried data when organizing an MAC PDU mainly refers to one or a combination of the following.

Manner 1: a priority of a specific bearer is temporarily increased.

For example, the priority of the specific bearer is increased to the highest or the priority of the specific bearer is increased after control information and before other service data.

Manner 2: an LCH restriction on the specific bearer is temporarily canceled, and use of resources that can reduce time latency and improve reliability is allowed, such as a configured grant.

Manner 3: automatic repetition transmission is temporarily started, for example, MAC PDUs of different redundancy versions (RV) are directly generated, and automatic repetition transmission is performed on adjacent scheduled resource devices.

Further, if no timers related to survival time are running or any one of the timers related to survival time expires, special processing for the specific bearer is stopped.

The embodiments of the present application are as follows.

Embodiment 1: Special Processing is to Increase a Priority of a Specific Bearer

A specific data transmission process includes:

Step 1: A Terminal Judges Whether Special Processing Needs to be Performed on Data of the Specific Bearer.

The specific bearer specifically refers to a bearer with a survival time requirement. When the specific bearer is specifically identified, it can be identified by a bearer-related special identifier. The special identifier may be carried by a QoS parameter during establishment of a session or a DRB, and may also be notified by cross-layer interaction.

A terminal specific protocol layer determines whether one or more timers related to survival time are running, and if the one or at least one of the more timers related to survival time is running, it is determined that special processing is performed on carried data when organizing an MAC PDU.

Lengths of the one or more timers may be fixed values or determined based on services, may be configured by a network, or agreed by a protocol. Their values are related to survival time, for example, it may be half of the survival time corresponding to the services.

The specific protocol layer specifically refers to a PDCP layer or an RLC layer or an MAC layer.

Step 2: When the MAC Layer Organizes the MAC PDU, Special Processing is Performed on the Data of the Specific Bearer.

Special processing may be temporary increasing of the priority of the specific bearer.

For example, the priority of the specific bearer is increased to the highest.

Data carried by the special processing;

a cell-radio network temporary identifier (C-RNTI) MAC control element (CE) or data from a UL-common control channel (UL-CCCH);

a configured grant confirmation MAC CE;

an MAC CE for BSR (with exception of BSR included for padding);

a single entry PHR MAC CE or multiple entry PHR MAC CE;

data from any logical channel (except data from UL-CCCH);

an MAC CE for recommended bit rate query; and an MAC CE for BSR included for padding.

For another example, the priority of the bearer is increased after control information and before other service data.

a C-RNTI MAC CE or data from a UL-CCCH;

a configured grant confirmation MAC CE;

an MAC CE for BSR (with exception of BSR included for padding);

a single entry PHR MAC CE or multiple entry PHR MAC CE;

data carried by the special processing;

data from any logical channel (except data from UL-CCCH);

an MAC CE for recommended bit rate query; and an MAC CE for BSR included for padding.

Step 3: when the MAC layer organizes the MAC PDU, special processing for the data of the specific bearer is stopped.

According to the specific protocol layer mentioned in step 1, if no timers related to survival time are running or any one of the timers related to survival time expires, special processing for the bearer is stopped when the MAC layer organizes the MAC PDU.

Embodiment 2: Special Processing is to Temporarily Cancel an LCH Restriction on a Bearer, and Allow Use of Resources that can Reduce Time Latency and Improve Reliability, Such as a Configured Grant Step 1: A Terminal Judges Whether Special Processing Needs to be Performed on Data of a Specific Service.

A specific bearer specifically refers to a bearer with a survival time requirement. When the specific bearer is specifically identified, it can be identified by a bearer-related special identifier. The special identifier may be carried by a QoS parameter during establishment of a session or a DRB, and may also be notified by cross-layer interaction.

A terminal specific protocol layer determines whether one or more timers related to survival time are running, and if the one or at least one of the more timers related to survival time is running, it is determined that special processing is performed on data of the specific bearer when organizing an MAC PDU.

Lengths of the one or more timers may be fixed values or determined based on services, may be configured by a network, or agreed by a protocol. Their values are related to survival time, for example, it may be half of the survival time corresponding to the services.

The specific protocol layer specifically refers to a PDCP layer or an RLC layer or an MAC layer.

Step 2: When the MAC Layer Organizes the MAC PDU, Special Processing is Performed on the Data of the Specific Bearer.

The special processing may be temporary cancellation of the LCH restriction on the bearer, and allowance of use of resources that can reduce time latency and improve reliability, such as a configured grant. At this time, the LCH restriction corresponding to the bearer can be ignored.

Step 3: When the MAC Layer Organizes the MAC PDU, Special Processing for the Data of the Specific Bearer is Stopped.

According to the specific protocol layer mentioned in step 1, if no timers related to survival time are running or any one of the timers related to survival time expires, special processing for the specific bearer is stopped when the MAC layer organizes the MAC PDU.

Embodiment 3: Repetition Transmission is Temporarily Started, for Example, MAC PDUs of Different RVs are Directly Generated, and Automatic Repetition Transmission is Performed on Adjacent Scheduled Resource Devices A data transmission process in the embodiment includes:

Step 1: A Terminal Judges Whether Special Processing Needs to be Performed on Data of a Specific Bearer.

The specific bearer specifically refers to a bearer with a survival time requirement. When the specific bearer is specifically identified, it can be identified by a bearer-related special identifier. The special identifier may be carried by a QoS parameter during establishment of a session or a DRB, and may also be notified by cross-layer interaction.

A terminal specific protocol layer determines whether one or more timers related to survival time are running, and if the one or at least one of the more timers related to survival time is running, it is determined that special processing is performed on the data of the specific bearer when organizing an MAC PDU.

Lengths of the one or more timers may be fixed values or determined based on services, may be configured by a network, or agreed by a protocol. Their values are related to survival time, for example, it may be half of the survival time corresponding to the services.

The specific protocol layer specifically refers to a PDCP layer or an RLC layer or an MAC layer.

Step 2: When the MAC Layer Organizes the MAC PDU, Special Processing is Performed on the Data of the Specific Bearer.

The special processing may be temporary start of repetition transmission, for example, MAC PDUs of different RVs are directly generated, and automatic repetition transmission is performed on adjacent scheduled resource devices.

In order to avoid data transmission conflicts, a network side also needs to maintain the same timer and predict that UE will perform repetition transmission, to avoid scheduled resource of data transmission on resources that may conflict.

Step 3: when the MAC layer organizes the MAC PDU, special processing for the data of the specific bearer is stopped.

According to the specific protocol layer mentioned in step 1, if no timers related to survival time are running or any one of the timers related to survival time expires, special processing for the specific bearer is stopped when the MAC layer organizes the MAC PDU.

Embodiment 4: PDCP Duplication of a Specific Bearer is Temporarily Activated A data transmission process in the embodiment includes:

Step 1: A Terminal Judges Whether Special Processing Needs to be Performed on Data of the Specific Bearer.

The specific bearer specifically refers to a bearer with a survival time requirement. When the specific bearer is specifically identified, it can be identified by a bearer-related special identifier. The special identifier may be carried by a QoS parameter during establishment of a session or a DRB, and may also be notified by cross-layer interaction.

A terminal specific protocol layer determines whether survival time-related one or more timers related to the specific bearer are running, and if the one or at least one of the more timers related to survival time is running, it is determined that special processing is performed on the data of the specific bearer when organizing an MAC PDU.

Lengths of the one or more timers may be fixed values or determined based on services, may be configured by a network, or agreed by a protocol. Their values are related to survival time, for example, it may be half of the survival time corresponding to the services.

The specific protocol layer specifically refers to a PDCP layer or an RLC layer or an MAC layer.

Step 2: Special Processing is Temporarily Performed on the Specific Bearer.

The special processing may be temporary activation of PDCP duplication corresponding to the specific bearer, that is, the same PDCP PDU corresponding to the specific bearer is transmitted through two different logical channels to obtain gain of duplication, that is, to reduce time latency and improve transmission reliability.

Step 3: Special Processing for the Data of the Specific Bearer is Stopped.

According to the specific protocol layer mentioned in step 1, if no timers related to survival time are running or any one of the timers related to survival time expires, special processing for the data of the specific bearer is stopped, that is, PDCP duplication is activated.

In summary, as shown in FIG. 1, Embodiments of the present application provide a data transmission method, including:

S101: determine whether one or more timers related to survival time corresponding to a data packet of a specific bearer are running.

S102: perform special processing configured to improve a success rate of data transmission on the data packet of the specific bearer when the one or at least one of the more timers is running.

The special processing is configured to improve a success rate of data transmission.

According to the method, whether the one or more timers related to survival time corresponding to the data packet of the specific bearer are running is determined; and when the one or at least one of the more timers is running, special processing is performed on the data packet of the specific bearer, to reduce transmission latency of data packet transmission and improve reliability of data packet transmission. The method can, after transmission of a data packet of a bearer has failed, ensure, to the greatest possible extent, that subsequent data packets are successfully transmitted, meeting requirements of IIOT and other special services with regard to packet loss.

In one embodiment, special processing specifically includes:

when organizing a media access control packet data unit (MAC PDU), packet data convergence protocol (PDCP) duplication corresponding to the specific bearer is activated, and/or the specific bearer is processed in one or a combination of the following manners.

Manner 1: a priority of the specific bearer is temporarily increased.

Manner 2: a priority restriction on a logical channel of the specific bearer is temporarily canceled, and use of resources that can reduce time latency and improve reliability is allowed.

Manner 3: repetition transmission is temporarily started, and automatic repetition transmission of the data packet is performed on adjacent scheduled resource devices.

In one embodiment, whether the timers related to survival time corresponding to the data packet of the specific bearer are running is determined through a packet data convergence protocol (PDCP) layer or a radio link control (RLC) layer or a media access control (MAC) layer.

In one embodiment, timer lengths of the one or more timers are preset fixed values or are determined based on services, and are configured by a network or agreed by a protocol.

In one embodiment, the specific bearer is a bearer with a survival time requirement.

In one embodiment, the specific bearer is identified according to a special identifier related to the bearer.

In one embodiment, the special identifier is carried by a quality of service (QoS) parameter during establishment of a session or a dedicated radio bear (DRB), or notified by cross-layer interaction.

In one embodiment, the method further includes:
if none of the one or more timers is running or any one of the one or more timers expires, special processing is stopped.

Figure 2:
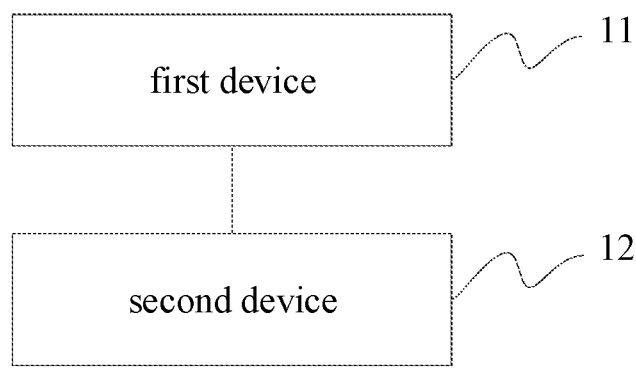
FIG. 2 is a schematic structural diagram of a data transmission device provided according to an embodiment of the present application.

Correspondingly, as shown in FIG. 2, Embodiments of the present application provide a data transmission device, including:

a first device 11, configured to determine whether one or more timers related to survival time corresponding to a data packet of a specific bearer are running; and a second device 12, configured to perform special processing on the data packet of the specific bearer when the one or at least one of the more timers is running.

In one embodiment, special processing specifically includes:

when organizing a media access control packet data unit (MAC PDU), the specific bearer is processed in one or a combination of the following manners, and/or packet data convergence protocol (PDCP) duplication corresponding to the specific bearer is activated.

Manner 1: a priority of the specific bearer is temporarily increased.

Manner 2: a priority restriction on a logical channel of the specific bearer is temporarily canceled, and use of resources that can reduce time latency and improve reliability is allowed.

Manner 3: repetition transmission is temporarily started, and automatic repetition transmission of the data packet is performed on adjacent scheduled resource devices.

In one embodiment, whether the one or more timers related to survival time corresponding to the data packet of the specific bearer are running is determined through a packet data convergence protocol (PDCP) layer or a radio link control (RLC) layer or a media access control (MAC) layer.

In one embodiment, timer lengths of the one or more timers are preset fixed values or are determined based on services, and are configured by a network or agreed by a protocol.

In one embodiment, the specific bearer is a bearer with a survival time requirement.

In one embodiment, the specific bearer is identified according to a special identifier related to the bearer.

In one embodiment, the special identifier is carried by a quality of service (QoS) parameter during establishment of a session or a dedicated radio bear (DRB), or notified by cross-layer interaction.

In one embodiment, if none of the one or more timers is running or any one of the one or more timers expires, special processing is stopped.

It should be noted that division of devices in the embodiments of the present application is schematic, and is only logical function division, and there may be other division methods in actual implementation. In addition, functional devices in each embodiment of the present application may be integrated into one processing device, or each device may exist alone physically, or two or more devices may be integrated into one device. The above integrated device may be implemented in a form of hardware or a form of a software functional device.

If the integrated device is implemented in the form of the software functional device and sold or used as an independent product, it may be stored in a computer readable storage medium. The computer software product is stored in a storage medium, including several instructions to make a computer device (which may be a personal computer, a server, or a network device, etc.) or a processor execute all or part of the steps of the method in the embodiments of the present application. The aforementioned storage medium includes a USB flash disk, a mobile hard disk, a read-only memory (ROM), a random access memory (RAM), a magnetic disk or an optical disk and other media that may store program codes.

Figure 3:
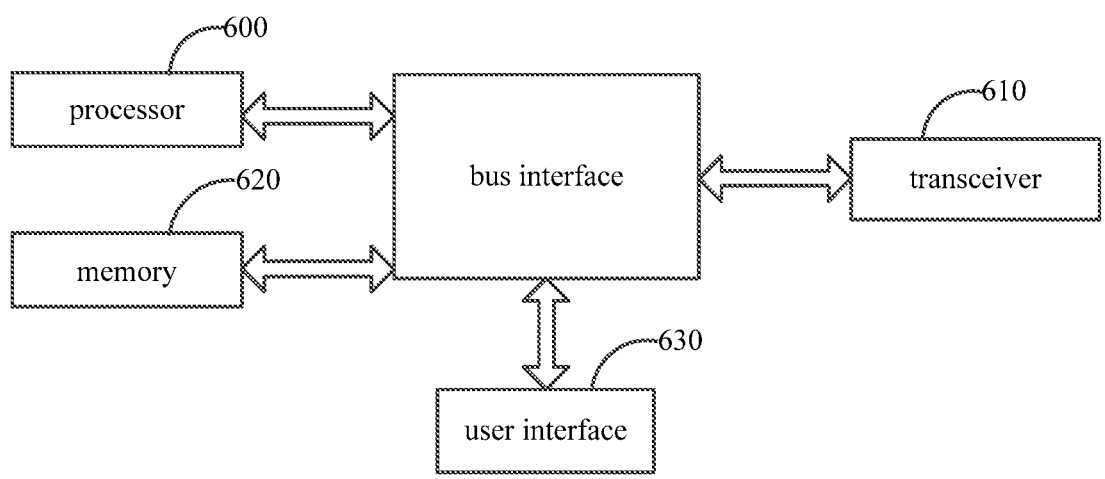
FIG. 3 is a schematic structural diagram of another data transmission device provided according to an embodiment of the present application.

As shown in FIG. 3, Embodiments of the present application provide a data transmission device, including:
- a memory 620, configured to store a program instruction; and
- a processor 600, configured to call the program instruction stored in the memory and execute the following according to an obtained program:
  - whether one or more timers related to survival time corresponding to a data packet of a specific bearer are running is determined; and
  - when the one or at least one of the more timers is running, special processing is performed on the data packet of the specific bearer.

In one embodiment, the special processing specifically includes:
- when organizing a media access control packet data unit (MAC PDU), the specific bearer is processed in one or a combination of the following manners, and/or packet data convergence protocol (PDCP) duplication corresponding to the specific bearer is activated.

Manner 1: a priority of the specific bearer is temporarily increased.

Manner 2: a priority restriction on a logical channel of the specific bearer is temporarily canceled, and use of resources that reduce time latency and improve reliability is allowed.

Manner 3: repetition transmission is temporarily started, and automatic repetition transmission of the data packet is performed on adjacent scheduled resource devices.

In one embodiment, whether the one or more timers related to survival time corresponding to the data packet of the specific bearer are running is determined through a packet data convergence protocol (PDCP) layer or a radio link control (RLC) layer or a media access control (MAC) layer.

In one embodiment, timer lengths of the one or more timers are preset fixed values or are determined based on services, and are configured by a network or agreed by a protocol.

In one embodiment, the specific bearer is a bearer with a survival time requirement.

In one embodiment, the specific bearer is identified according to a special identifier related to the bearer.

In one embodiment, the special identifier is carried by a quality of service (QoS) parameter during establishment of a session or a dedicated radio bear (DRB), or notified by cross-layer interaction.

In one embodiment, if none of the one or more timers is running or any one of the one or more timers expires, the processor 600 stops special processing.

In one embodiment, the data transmission device provided according to the embodiments of the present application may further include a transceiver 610 and a user interface 630. The transceiver 610 is used for data communication between the data transmission device and other devices or apparatuses. The user interface 630 is used for the data transmission device to obtain user operation instructions or user data.

The device provided according to the embodiments of the present application may be a computing device. The computing device may specifically be a desktop computer, a portable computer, a smart phone, a tablet computer, a PDA and the like. The computing device may include a center processing unit (CPU), a memory, an input/output device and the like. The input device may include a keyboard, a mouse, a touch screen and the like. The output device may include a display device, such as a liquid crystal display (LCD), a cathode ray tube (CRT), etc.

The memory may include an ROM and an RAM, and provide the processor with a program instruction and data stored in the memory. In the embodiments of the present application, the memory may be used to store a program of any method provided according to the embodiments of the present application.

The processor calls the program instruction stored in the memory, and the processor is used to execute any method provided according to the embodiments of the present application according to the obtained program instruction.

Embodiments of the present application provide a computer storage medium used for storing the computer program instruction used by the device provided according to the foregoing embodiments of the present application, which includes the program for executing any method provided according to the foregoing embodiment of the present application.

The computer storage medium may be any available medium or data storage device that a computer can access, including but not limited to a magnetic memory (such as a floppy disk, a hard disk, a magnetic tape, a magneto-optical disk (MO), etc.), an optical memory (such as a CD, a DVD, a BD, an HVD, etc.) and a semiconductor memory (such as an ROM, an EPROM, an EEPROM, a NAND FLASH and a solid state drive (SSD)) and the like.

The method provided according to the embodiments of the present application may be applied to a terminal device, and may also be applied to a network device.

The terminal device may also be called UE, mobile station (MS), mobile terminal, etc. In one embodiment, a terminal may have an ability to communicate with one or more core networks via RAN. For example, the terminal may be a mobile phone (or called a "cellular" phone), or a mobile computer. For example, the terminal may also be a portable, pocket-sized, handheld, built-in computer or vehicle-mounted mobile device.

The network device may be a base station (for example, an access point), which refers to a device that communicates with a wireless terminal through one or more sectors on an air interface in an access network. The base station may be used to convert received air frames and IP packets to each other, as a router between the wireless terminal and the rest of the access network. The rest of the access network may include an IP network. The base station may also coordinate attribute management of the air interface. For example, the base station may be a BTS in a GSM or a CDMA, NodeB in a WCDMA, evolutional node B in an LTE, or gNB in a 5G system and the like, which is not limited in the embodiments of the present application.

A processing flow of the above method may be implemented by a software program. The software program may be stored in the storage medium. When the stored software program is called, steps of the above method are executed.

In summary, in the embodiments of the present application, the terminal specific protocol layer determines whether the one or more timers related to survival time are running. If the one or at least one of the more timers related to survival time is running, special processing is performed on the bearer. The special processing specifically includes that special processing is performed on the bearer and/or PDCP duplication corresponding to the bearer is activated when organizing the MAC PDU. That is, the embodiments of the present application provide a solution to ensure reliability of data packet latency, which may, after transmission of the first data packet has failed, ensure, to the greatest possible extent, that the second subsequent data packet can be successfully transmitted, meeting requirements of the IIOT service with regard to packet loss.

The embodiments of the present application may be provided as methods, systems, or computer program products. Therefore, the present application may adopt a form of a complete hardware embodiment, a complete software embodiment, or an embodiment combining software and hardware. Moreover, the present application may adopt a form of a computer program product implemented on one or more computer-usable storage media (including but not limited to disk memories, optical memories, etc.) containing computer-usable program codes.

The present application is described with reference to flowcharts and/or block diagrams of methods, devices (systems) and computer program products according to the embodiments of the present application. It should be understood that each flow and/or block in the flowcharts and/or block diagrams, and a combination of flows and/or blocks in the flowcharts and/or block diagrams may be implemented by computer program instructions. These computer program instructions may be provided to processors of a general-purpose computer, a special-purpose computer, an embedded processor, or other programmable data processing devices to generate a machine, so that the device that achieves functions specified in one flow or multiple flows in the flowcharts and/or one block or multiple blocks in the block diagrams is generated through instructions executed by the processors of the computers or other programmable data processing devices.

These computer program instructions may also be stored in a computer-readable memory that can guide the computers or other programmable data processing devices to work in a specific manner, so that the instructions stored in the computer-readable memory produce a manufacture including the instruction device. The instruction device achieves the functions specified in one flow or multiple flows in the flowcharts and/or one block or multiple blocks in the block diagrams.

These computer program instructions may also be loaded on the computers or other programmable data processing devices, so that a series of operation steps are executed on the computers or other programmable devices to produce computer-implemented processing, so that the instructions executed on the computers or other programmable devices provide steps for achieving the functions specified in one flow or multiple flows in the flowcharts and/or one block or multiple blocks in the block diagrams.

What is claimed is:

1. A data transmission method, comprising:
   determining whether one or more timers related to survival time corresponding to a specific bearer are running; and
   performing special processing on the specific bearer when the one or at least one of the one or more timers is running;
   wherein the special processing comprises:
   when organizing a media access control (MAC) packet data unit (PDU), processing the specific bearer in one or a combination of following manners, and/or activating a packet data convergence protocol (PDCP) duplication for the specific bearer:
   manner 1: temporarily increasing a priority of the specific bearer;
   manner 2: temporarily canceling a priority restriction on a logical channel of the specific bearer, and allowing use resources that reduce time latency and improve reliability; and
   manner 3: temporarily starting repetition transmission, and performing automatic repetition transmission of a data packet of the specific bearer on an adjacent scheduled resource device.

2. The method according to claim 1, wherein whether the one or more timers related to survival time corresponding to the specific bearer are running is determined through a packet data convergence protocol (PDCP) layer or a radio link control (RLC) layer or a media access control (MAC) layer.

3. The method according to claim 1, wherein timer lengths of the one or more timers are preset fixed values in a protocol, or the timer lengths of the one or more timers are configured by a network.

4. The method according to claim 1, wherein the specific bearer is a bearer with a survival time requirement.

5. The method according to claim 4, wherein the specific bearer is identified by a special identifier.

6. The method according to claim 5, wherein the special identifier is carried by a quality of service (QoS) parameter during establishment of a session or a dedicated radio bear (DRB), or notified by cross-layer interaction.

7. The method according to claim 1, further comprising:
   if none of the one or more timers is running or any one of the one or more timers expires, stopping the special processing.

8. A data transmission device, comprising:
   a memory, configured to store a program instruction; and
   a processor, configured to call the program instruction stored in the memory and execute the following according to an obtained program:
   determining whether one or more timers related to survival time corresponding to a specific bearer are running; and performing special processing on the specific bearer when the one or at least one of the one or more timers is running;

wherein the special processing comprises:

when organizing a media access control (MAC) packet data unit (PDU), processing the specific bearer in one or a combination of following manners, and/or activating a packet data convergence protocol (PDCP) duplication for the specific bearer:

manner 1: temporarily increasing a priority of the specific bearer;

manner 2: temporarily canceling a priority restriction on a logical channel of the specific bearer, and allowing use of resources that reduce time latency and improve reliability; and manner 3: temporarily starting repetition transmission, and performing automatic repetition transmission of a data packet of the specific bearer on an adjacent scheduled resource device.

9. The device according to claim 8, wherein whether the one or more timers related to survival time corresponding to the specific bearer are running is determined through a packet data convergence protocol (PDCP) layer or a radio link control (RLC) layer or a media access control (MAC) layer.

10. The device according to claim 8, wherein timer lengths of the one or more timers are preset fixed values in a protocol, or the timer lengths of the timers are configured by a network.

11. The device according to claim 8, wherein the specific bearer is a bearer with a survival time requirement.

12. The device according to claim 11, wherein the specific bearer is identified by a special identifier.

13. The device according to claim 12, wherein the special identifier is carried by a quality of service (QoS) parameter during establishment of a session or a dedicated radio bear (DRB), or notified by cross-layer interaction.

14. The device according to claim 8, wherein if none of the one or more timers is running or any one of the one or more timers expires, the processor stops the special processing.

15. A non-transitory computer storage medium, wherein the computer storage medium stores a computer-executable instruction configured to make a computer execute the method according to claim 1.

16. A data transmission device, comprising:

a first device, configured to determine whether one or more timers related to survival time corresponding to a specific bearer are running; and a second device, configured to perform special processing on the specific bearer when the one or at least one of the more timers is running;

wherein the special processing comprises:

when organizing a media access control (MAC) packet data unit (PDU), processing the specific bearer in one or a combination of following manners, and/or activating a packet data convergence protocol (PDCP) duplication for the specific bearer:

manner 1: temporarily increasing a priority of the specific bearer;

manner 2: temporarily canceling a priority restriction on a logical channel of the specific bearer, and allowing use of resources that reduce time latency and improve reliability; and manner 3: temporarily starting repetition transmission, and performing automatic repetition transmission of a data packet of the specific bearer on an adjacent scheduled resource device.

* * * * *